United States Patent
Hooper

(10) Patent No.: US 8,147,347 B2
(45) Date of Patent: Apr. 3, 2012

(54) GOLF PRACTICE MAT

(75) Inventor: Michael Hooper, Chestermere (CA)

(73) Assignee: 766089 Alberta Ltd., Calgary (CA)

(*) Notice: Subject to any disclaimer, the term of this patent is extended or adjusted under 35 U.S.C. 154(b) by 0 days.

(21) Appl. No.: 13/093,978

(22) Filed: Apr. 26, 2011

(65) Prior Publication Data

US 2011/0201441 A1 Aug. 18, 2011

Related U.S. Application Data

(62) Division of application No. 12/353,823, filed on Jan. 14, 2009, now Pat. No. 7,946,935.

(60) Provisional application No. 61/020,947, filed on Jan. 14, 2008.

(51) Int. Cl.
*A63B 69/36* (2006.01)

(52) U.S. Cl. ........................ 473/278; 473/279

(58) Field of Classification Search .................. 473/478, 473/479; 428/85, 137, 165
See application file for complete search history.

(56) References Cited

U.S. PATENT DOCUMENTS

| | | | | |
|---|---|---|---|---|
| 3,171,484 A * | 3/1965 | Thal | | 428/89 |
| 3,357,075 A * | 12/1967 | Law | | 28/160 |
| 3,856,598 A * | 12/1974 | Gregorian et al. | | 156/85 |
| 3,874,958 A * | 4/1975 | Scholtis et al. | | 216/7 |
| 5,443,870 A | 8/1995 | Lurie et al. | | |
| 5,567,501 A * | 10/1996 | Srinivasan et al. | | 428/137 |
| D429,304 S | 8/2000 | Browne, Jr. | | |
| D464,519 S | 10/2002 | Fernando | | |
| D520,097 S | 5/2006 | Walch | | |
| D521,096 S | 5/2006 | Pelz | | |
| 7,208,208 B1 * | 4/2007 | Lane et al. | | 428/34.1 |
| 7,435,264 B2 * | 10/2008 | Kiff | | 8/114.6 |
| 7,556,841 B2 * | 7/2009 | Kimball et al. | | 427/292 |
| 2006/0128493 A1 | 6/2006 | Snopkowski | | |
| 2007/0082171 A1 * | 4/2007 | Fulton | | 428/87 |
| 2007/0167251 A1 | 7/2007 | Pathross et al. | | |
| 2008/0315466 A1 | 12/2008 | Hood et al. | | |

* cited by examiner

*Primary Examiner* — Nini Legesse
(74) *Attorney, Agent, or Firm* — Bennett Jones LLP

(57) ABSTRACT

A golf practice mat including a surface pattern formed by thermally deforming and allowing setting of the deformed mat surface.

18 Claims, 1 Drawing Sheet

GOLF PRACTICE MAT

CROSS REFERENCE TO RELATED APPLICATIONS

This application is a divisional application of U.S. application Ser. No. 12/353,823 filed Jan. 14, 2009. U.S. application Ser. No. 12/353,823 and the present application claim priority under 35 U.S.C. §119(e) to U.S. provisional patent application No. 61/020,947 filed Jan. 14, 2008.

FIELD

The present invention relates to a golf practice mat.

BACKGROUND

Golf practice mats are used by golfers to practice their swings. Many forms of practice mats are available. In general a golf practice mat includes a surface on which a ball can be placed. Some mats also are extended to include a place for a golfer to stand. The surface generally is formed to be durable to withstand repeated club strikes and often is formed to simulate a natural ground surface such as short or long grass.

Some mats have been constructed to include surface indications such as lines to assist with stance or club alignment. In other instances, it may be desirous to place other indications such as advertising indicia on the mats. However, where a mat seeks to simulate a grass surface, such surface indications are difficult to form uniformly, durably or in an economic fashion.

SUMMARY

According to one aspect of the present invention, there is provided a golf practice mat comprising: an upper surface formed of thermoformable material; and a surface indication in the upper surface formed by heat deforming the upper surface to assume a deformed shape and allowing the upper surface to set in the deformed shape.

According to another aspect of the present invention, there is provided a method for forming a golf practice mat comprising: providing a planar sheet of material including an upper surface, the upper surface formed of a thermoformable material; heating the upper surface substantially to the melting temperature of the thermoformable material; applying a die to the upper surface to deform the upper surface in a shape corresponding to the die; allowing the upper surface to set into the shape; and shaping the shaping the layer of sheet material into a shape for a golf mat.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DESCRIPTION OF VARIOUS EMBODIMENTS

Figure 1:
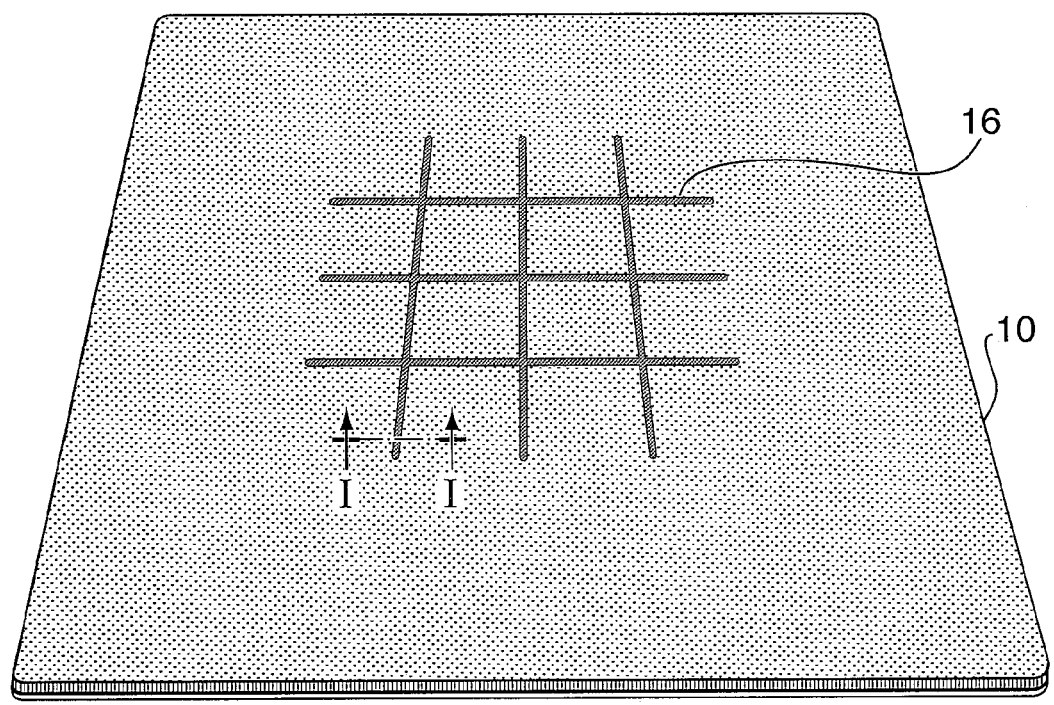
FIG. 1 is a perspective view of a golf practice mat according to one aspect of the present invention.

The description that follows, and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

A golf practise mat may include surface indications formed by thermal deformation of the material of the mat's upper surface. Such indications may be durable, accurate and economically feasible for mat construction.

A mat may include a layer of sheet material one side of which creates an upper surface for the mat. At least the material of the upper surface is thermally formable such that it can be deformed by melting and, when allowed to reset after melting and deformation, durably retains the deformed shape. The upper surface may include foam construction or fibers. For example, in one embodiment, the sheet material may have an upper surface formed of fibers constructed in the form of a carpet with woven, knit, looped, cut, etc. pile on a backing material or constructed in the form of a brush wherein the fibers are similar to bristles secured to and extending from a backing material. Such sheet materials may be termed as "artificial turf".

The thermally formable material allows the upper surface of the mat to be heated to its melting point and shaped by applying pressure to the upper surface. The shape achieved by melting and deformation by application of pressure remains when the temperature of the upper surface falls below the melting point.

Figure 2:
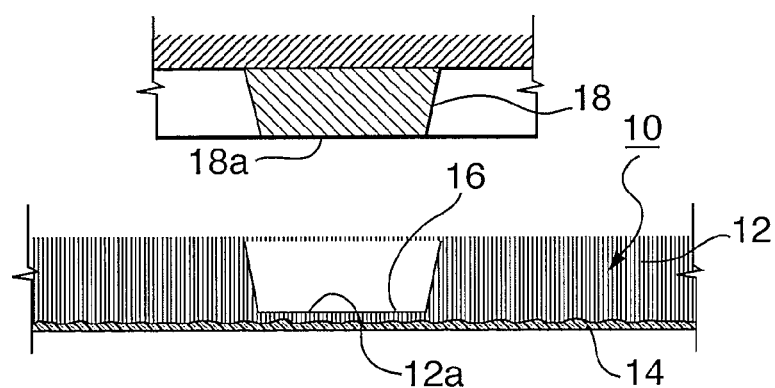
FIG. 2 is a sectional view along line I-I of FIG. 1.

With reference to FIGS. 1 and 2, for example, a mat 10 is shown including an upper surface. The upper surface is formed to support a golfer and/or a golf ball. In the illustrated embodiment, mat 10 includes an upper surface sized to accommodate both a golfer in a golf stance thereon and a ball, although one or the other may not be positioned on the mat at all times during use.

As desired, mat 10 may be used (i) alone, (ii) mounted in a frame, (iii) on a selected underlay, (iv) alongside a ball tray, (v) alongside a tee holding area, etc.

While other mat forms may be used, mat 10, in the illustrated embodiment, is formed of an artificial turf material including fibers 12 in cut strands and/or loops extending from a backing material 14 that acts as a more structurally secure portion to retain the fibers of the mat. Fiber lengths may vary from mat to mat or within a mat, as desired. The upper surface of the mat is formed by the upper limits of fibers 12. Fibers 12 are formed of thermoformable material such as durable thermoplastics or durable thermosetting polymers. In one embodiment, a thermoplastic such as nylon may be useful.

The upper surface of mat 10 includes a surface pattern 16 formed therein by melting and deforming at least some of fibers 12 and allowing them to reset in the deformed condition. In the illustrated embodiment, the surface pattern defines a practise aid including a plurality of lines intersecting in a grid useful for stance, swing and/or ball alignment. However, the surface pattern may take other forms such as logos, advertising indicia, other practise aids, etc. Practise aids may include alignment indicia, stance indicia, ball placement indicia, etc. The surface pattern may include regions of one depth and one or more regions of other depths, as desired.

Surface pattern 16, being formed by melting and deforming the mat materials from their original form, often results in the surface pattern being indented from the upper surface of the surrounding mat. Of course, it is to be understood that the surface pattern could be formed by melting and deforming the mat surrounding the surface pattern. The present disclosure would apply in that case, as it is the same invention.

As can be seen in the illustrated embodiment, fibers 12 of the mat surrounding surface pattern 16 are upstanding, while those fibers 12a in the area of surface pattern 16, which were previously similar to fibers 12, are in a condition pushed/bent down, partially removed and/or fused together and/or to backing 14. The surface pattern may have a bottom surface having a consistent planar appearance, as shown, or having portions that are contoured or raised relative to others but still below the upper surface of the fibers of the mat surrounding surface pattern.

Because of the melting and setting action of the fiber treatment, the area of mat at surface pattern 16 may be stiffened and in some cases strengthened by the fusion of the fibers. It is noted however, that a mat can be weakened if a substantial portion of the backing material is removed or weakened during the upper surface heat treatment. Thus, care may be taken to heat treat the mat without overly weakening the backing material. In one embodiment, for example, only a portion of the mat, for example, only the uppermost tips of the bristles or a selected depth of bristles 12 are deformed. In one embodiment, the backing material may be formed of a material not meltable to the same extent as the material defining the upper surface. For example, the backing material may be formed of a thermoplastic that melts at a temperature higher than the thermoplastic of the fibers. In another embodiment, the heat treatment is controlled such that only a selected depth of the mat is melted, leaving at least a portion of the backing unmelted. In another embodiment, the backing material is selected to also be deformed by the heat treating process but to render it fused into a durable form.

In one method for manufacturing a mat with a thermally formed surface indication, a die 18 is formed having an outer surface 18a in a shape to resemble, in a mirror image thereof, at least a portion of the surface pattern. For example, the die surface to be used for thermoforming the mat can be shaped to define all or a part of a logo, advertising indicia or practise aid. The die can be formed of a metal, ceramic, polymer, epoxy or other material that is capable of withstanding, being heated or conveying heat of a temperature greater than the melting temperature of the material forming the upper surface of the mat.

In order to thermally deform the material of the upper surface, the material is heated to a temperature above its forming temperature, which is often considered its melting temperature.

The melting temperatures for thermoformable materials are often well know material characteristics and can, in any event, be readily determined for example by simple testing or contacting the material manufacturer. A temperature may be used wherein the material of the upper surface retains its original form until it has pressure applied thereto. At such a temperature, the material may become highly viscous but formable. For example, the strands 12 may retain their shape but can be deformed to crush and fuse by application of pressure thereto.

In order to reach these temperatures, the sheet material can be placed in an atmosphere with an elevated temperature such that the deformable material can increase substantially to the selected melting temperature. For example, the sheet material can be placed in a heating oven at a temperature to bring the material to its forming temperature and the die can be pressed thereagainst. Alternately, or in addition, the die can be heated, as by heating it directly or driving the die to convey and emit therefrom thermal energy, and placed into contact with the upper surface of the mat. In so doing, the upper surface of the mat is heat deformed in a shape which is the reverse of the die's outer surface 18a shape, both with respect to the surface relief and perimeter shape, of the die surface. Of course, the rear surface of the sheet material may be supported to hold the sheet material against the pressure of the die.

Thereafter, the heat can be removed to allow the thermally deformed area to cool and thereby set. The heat can be removed by cooling the sheet material (i.e. removing the sheet material from the heated atmosphere), by allowing the die to cool or by removing the hot die from the upper surface. Time is then permitted for the melted mat material to cool and set in its deformed shape.

As will be appreciated, this surface melting process may be termed mat "branding".

Care may be taken to select a die, which includes a surface that tends not to stick to the material to be melted. This may be by selection of material, surface coating and/or temperature.

At some point, the sheet material is shaped as by cutting into sizes and/or shapes to be useful as a golf practise mat. For example, the sheet material may be cut into suitable sizes and shapes before, during or after the thermal treatment to create surface pattern 16. Some useful sizes may be those sized to accommodate a golfer in a golf stance such as a 3 to 4 foot length/diameter (0.8 to 1.2 m) polygon or circle.

The mat may be used on its own, or provided with further golf practise mat structures. The mat may be provided with or mounted alongside a golf tee holding structure, including an aperture through which a tee or a tee holder may be inserted. Alternately, the mat may be mounted on a frame such as may include a ball supply tray.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A golf practice mat comprising:
   an upper surface formed of thermoformable material and a backing material, the thermoformable material including upstanding fibers extending up a height from the backing material; and
   a surface indication in the upper surface, the surface indication including an indentation surrounded by the upstanding fibers, the indentation having a bottom surface recessed relative to the height of the plurality of upstanding fibers, the bottom surface including melt-deformed fibers that are: (i) partially removed, (ii) fused together and/or (iii) fused to the backing material, compared to the upstanding fibers.

2. The golf practice mat of claim 1 wherein the surface indication defines at least one of: a logo, an advertising indicia, and a golf practise aid.

3. The golf practice mat of claim 1 wherein the bottom surface includes a region at first depth extending down from a plane defined by the upper surface about the surface indication and one or more other regions defining a depth other than the first depth.

4. The golf practice mat of claim 1 wherein the upstanding fibers are bristles and the melt-deformed fibers are melt-deformed bristles.

5. The golf practice mat of claim 1 wherein the thermoformable material includes at least one of a thermoplastic or a thermoset polymer.

6. The golf practice mat of claim 1 further comprising a ball supply tray mounted adjacent the upper surface.

7. The golf practice mat of claim 1 further comprising a golf tee holding structure adjacent the upper surface.

8. The golf practice mat of claim 7 wherein the golf tee holding structure is an aperture formed adjacent the upper surface.

9. The golf practice mat of claim 7 wherein the golf tee holding structure is an aperture formed through the upper surface.

10. A golf practice mat comprising:
    an upper surface including a backing material, upstanding thermoformable plastic fibers connected to the backing material and thermoformable plastic deformed fibers connected to the backing material, the thermoformable plastic deformed fibers having a condition (i) partially removed, (ii) fused together and/or (iii) fused to the backing material, compared to the upstanding thermoformable plastic fibers; and
    the thermoformable plastic, deformed fibers being grouped together and the upstanding thermoformable plastic fibers being grouped together and being positioned adjacent the thermoformable plastic, deformed fibers to define a shape on the upper surface.

11. The golf practice mat of claim 10 wherein the shape defines at least one of: a logo, an advertising indicia, and a golf practise aid.

12. The golf practice mat of claim 10 wherein the thermoformable plastic, deformed fibers and the upstanding thermoformable plastic fibers each have a height at which they extend from the backing material and the height of the thermoformable plastic, deformed fibers is less than the height of the upstanding thermoformable plastic fibers.

13. The golf practice mat of claim 10 wherein the upstanding thermoformable plastic fibers are bristles and the thermoformable plastic, deformed fibers are deformed bristles, compared to the bristles.

14. The golf practice mat of claim 10 further comprising a ball supply tray mounted adjacent the upper surface.

15. The golf practice mat of claim 10 further comprising a golf tee holding structure adjacent the upper surface.

16. The golf practice mat of claim 15 wherein the golf tee holding structure is an aperture formed adjacent the upper surface.

17. The golf practice mat of claim 15 wherein the golf tee holding structure is an aperture formed through the upper surface.

18. The golf practise mat of claim 15 wherein the thermoformable plastic includes at least one of a thermoplastic or a thermoset polymer.

* * * * *